United States Patent
Son et al.

(10) Patent No.: US 12,362,904 B2
(45) Date of Patent: Jul. 15, 2025

(54) HOMOMORPHIC ENCRYPTION OPERATION ACCELERATOR, AND OPERATING METHOD OF HOMOMORPHIC ENCRYPTION OPERATION ACCELERATOR

(71) Applicant: Samsung Electronics Co., Ltd., Suwon-si (KR)

(72) Inventors: Hongrak Son, Anyang-si (KR); Sangpyo Kim, Suwon-si (KR); Jongmin Kim, Seoul (KR); Jungho Ahn, Seoul (KR); Hanbyeul Na, Yongin-si (KR); Youngsik Moon, Suwon-si (KR); Junho Shin, Suwon-si (KR)

(73) Assignees: Samsung Electronics Co., Ltd., Gyeonggi-do (KR); Seoul National University R&DB Foundation, Seoul (KR)

(*) Notice: Subject to any disclaimer, the term of this patent is extended or adjusted under 35 U.S.C. 154(b) by 182 days.

(21) Appl. No.: 17/968,375

(22) Filed: Oct. 18, 2022

(65) Prior Publication Data
US 2023/0269067 A1    Aug. 24, 2023

(30) Foreign Application Priority Data

Feb. 18, 2022 (KR) .................. 10-2022-0021622
Apr. 19, 2022 (KR) .................. 10-2022-0048140

(51) Int. Cl.
H04L 9/00    (2022.01)
G06F 7/72    (2006.01)
H04L 9/06    (2006.01)

(52) U.S. Cl.
CPC .............. *H04L 9/008* (2013.01); *G06F 7/722* (2013.01); *H04L 9/0618* (2013.01); *H04L 2209/122* (2013.01)

(58) Field of Classification Search
CPC ........ H04L 9/008; H04L 9/0618; G06F 7/722
See application file for complete search history.

(56) References Cited

U.S. PATENT DOCUMENTS 10,069,578 B2    9/2018    Tsai et al.
2018/0375639 A1*  12/2018   Lauter .................... H04L 9/008
(Continued)

FOREIGN PATENT DOCUMENTS

CN    113343262 A    9/2021
CN    113986199 A    1/2022
(Continued)

OTHER PUBLICATIONS

Sangpyo Kim, et al. "BTS: An Accelerator for Bootstrappable Fully Homomorphic Encryption", arXiv:2112.15479v2 [cs.CR] Apr. 29, 2022.
(Continued)

*Primary Examiner* — Phy Anh T Vu
(74) *Attorney, Agent, or Firm* — Harness, Dickey & Pierce, P.L.C.

(57) ABSTRACT

A method of operating a homomorphic encryption operation accelerator includes performing a number theoretic transform (NTT) operation on each of first homomorphic ciphertext and second homomorphic ciphertext, and performing a base conversion operation by adding a partial sum using a first value of the NTT operation.

17 Claims, 12 Drawing Sheets

(56) References Cited

U.S. PATENT DOCUMENTS

| | | | |
|---|---|---|---|
| 2020/0213079 A1 | 7/2020 | Kreeger et al. | |
| 2021/0028921 A1* | 1/2021 | Khedr | H04L 9/0618 |
| 2021/0075588 A1* | 3/2021 | Khedr | H04L 9/008 |
| 2021/0328766 A1 | 10/2021 | No et al. | |
| 2021/0336765 A1 | 10/2021 | No et al. | |
| 2021/0344479 A1 | 11/2021 | Lee et al. | |
| 2021/0351912 A1* | 11/2021 | No | H04L 9/008 |
| 2021/0351913 A1 | 11/2021 | No et al. | |
| 2021/0376996 A1* | 12/2021 | Moon | H04L 9/0618 |
| 2021/0376997 A1 | 12/2021 | Lim et al. | |
| 2021/0409189 A1 | 12/2021 | Yoo et al. | |
| 2022/0014351 A1* | 1/2022 | Jung | H04L 9/008 |
| 2022/0029644 A1 | 1/2022 | Balakrishnan et al. | |
| 2022/0038478 A1 | 2/2022 | Boudguiga et al. | |
| 2022/0094521 A1 | 3/2022 | Moon et al. | |
| 2023/0146149 A1* | 5/2023 | Moon | H04L 9/008 380/28 |
| 2023/0163945 A1* | 5/2023 | Park | G06F 7/4876 713/168 |
| 2023/0216655 A1* | 7/2023 | Liao | H04L 9/008 380/28 |
| 2024/0235809 A1* | 7/2024 | Cheon | H04L 9/08 |
| 2024/0313945 A1* | 9/2024 | Choi | H04L 9/3093 |

FOREIGN PATENT DOCUMENTS

| | | | | |
|---|---|---|---|---|
| EP | 4307606 A1 * | 1/2024 | | H04L 9/008 |
| KR | 10-2021-0116299 A | 9/2021 | | |
| WO | WO-2021-182908 A1 | 9/2021 | | |

OTHER PUBLICATIONS

Wonkyung Jung, et al. "HEAAN Demystified: Accelerating Fully Homomorphic Encryption Through Architecture-centric Analysis and Optimization", arXiv:2003.04510v1 [cs.DC] Mar. 20, 2020.

Wonkyung Jung, et al. "Over 100x Faster Bootstrapping in Fully Homomorphic Encryption through Memory-centric Optimization with GPUs", IACR Transaction on Cryptographic Hardware and Embedded Systems, ISSN 2569-2925, vol. 2021, No. 4, pp. 114-148, Aug. 11, 2021.

* cited by examiner

HOMOMORPHIC ENCRYPTION OPERATION ACCELERATOR, AND OPERATING METHOD OF HOMOMORPHIC ENCRYPTION OPERATION ACCELERATOR

CROSS-REFERENCE TO RELATED APPLICATION(S)

This application claims benefit of priority to Korean Patent Application Nos. 10-2022-0021622 filed on Feb. 18, 2022 in the Korean Intellectual Property Office and 10-2022-0048140 filed on Apr. 19, 2022 in the Korean Intellectual Property Office, the disclosure of which is incorporated herein by reference in their entirety.

BACKGROUND

One or more example embodiments relate to a homomorphic encryption operation accelerator, and a method of operating the homomorphic encryption operation accelerator.

In general, homomorphic encryption may obtain the same result as a value that is encrypted after an operation is performed on plain text for an operation performed in a ciphertext state without decrypting encrypted information. Therefore, various operations such as statistical processing, machine learning, and the like may be performed without decrypting ciphertext. Thus, homomorphic encryption is a core technique to which companies providing big data-based services have been paying attention. The biggest issue in the commercialization of homomorphic encryption techniques may be the size of ciphertext, which may increase tens of times more than that of original data.

SUMMARY

Example embodiments provide a homomorphic encryption operation accelerator for reducing an operation time, and a method of operating the homomorphic encryption operation accelerator.

According to an example embodiment, there is provided a method of operating a homomorphic encryption operation accelerator, the method including performing a number theoretic transform (NTT) operation on each of first homomorphic ciphertext and second homomorphic ciphertext, and performing a base conversion operation by adding a partial sum using a first value of the NTT operation.

According to another example embodiment, there is provided a method of operating a homomorphic encryption operation accelerator, the method including storing, in a first level register file, first data to be used for a base conversion operation, moving second data of the first level register file to a transposing unit, the second data being included in the first data, moving the second data from the transposing unit to a second level register file, performing a modular multiplication and accumulation operation using the second data stored in the second level register file, determining whether the second data of the second level register file is exhausted, determining whether the first data of the first level register file is exhausted in response to the second data of the second level register file being exhausted, and determining whether the base conversion operation is completed in response to the first data of the first level register file being exhausted.

According to another example embodiment, there is provided a homomorphic encryption operation accelerator including processing circuitry configured to perform an NTT operation related to a polynomial corresponding to ciphertext, and convert a base set of the NTT unit into a base set on a residue number system (RNS) by adding a partial sum using at least a part of a result value of the NTT unit.

According to some example embodiments, a homomorphic encryption operation accelerator and a method of operating the homomorphic encryption operation accelerator may perform an NTT operation and a base conversion operation in parallel, thereby significantly reducing homomorphic encryption operation time.

According to some example embodiments, the homomorphic encryption operation accelerator and the method of operating the homomorphic encryption operation accelerator may reduce an amount of energy consumed in an operation process through a hierarchical register file (RF) structure.

BRIEF DESCRIPTION OF DRAWINGS

The above and other example embodiments, features, and advantages of the present inventive concepts will be more clearly understood from the following detailed description, taken in conjunction with the accompanying drawings, in which.

DETAILED DESCRIPTION

Hereinafter, example embodiments are described with reference to the accompanying drawings.

In general, homomorphic encryption may combine and compute encrypted data using a mathematical characteristic such as a homomorphic operation. Homomorphic encryption may store, transmit, combine, and compute data in an encrypted state, and thus it is not required to perform re-identification processing in an entire data flow. Details of homomorphic encryption have been filed by Samsung Electronics, and are described in US 2021-0328766 (Jong Seon No), US 2022-0094521 (Youngsik MOON), US 2022-0014351 (Ju-Young Jung), US 2021-0409189 (Dong-Hoon Yoo), US 2021-0376996 (Youngsik MOON), US 2021-0376997 (Jin Soo Lim), US 2021-0351912 (Jong Seon No), US 2021-0351913 (Jong Seon No), US 2021-0344479 (Wijik LEE), and US 2021-0336765 (Jong Seon No), incorporated by reference in the present application.

A homomorphic encryption scheme may include partially homomorphic encryption (PHE), somewhat homomorphic encryption (SHE), and fully homomorphic encryption (FHE). PHE allows only one type of mathematical operation (for example, multiplication) for a given data set. SHE allows a limited number of times of additions and multiplications for a given data set. FHE allows various types of operations on a data set without limiting the number of times.

There are various encryption schemes such as Brakerski, Gentry, and Vaikuntanathan (BGV), Brakerski, Fan, and Vercauteren (BFV), Cheon, Kim, Kim and Song (CKKS), and the like. The homomorphic encryption schemes generate ciphertext through an encryption operation process of mapping a message to an n-th order polynomial pair in a process of encrypting the message according to the definition of a ring-learning with error (R-LWE), a basic challenge, adding a noise value referred to as an error polynomial, incorporating an encryption key polynomial into a message polynomial, and the like.

Figure 1:
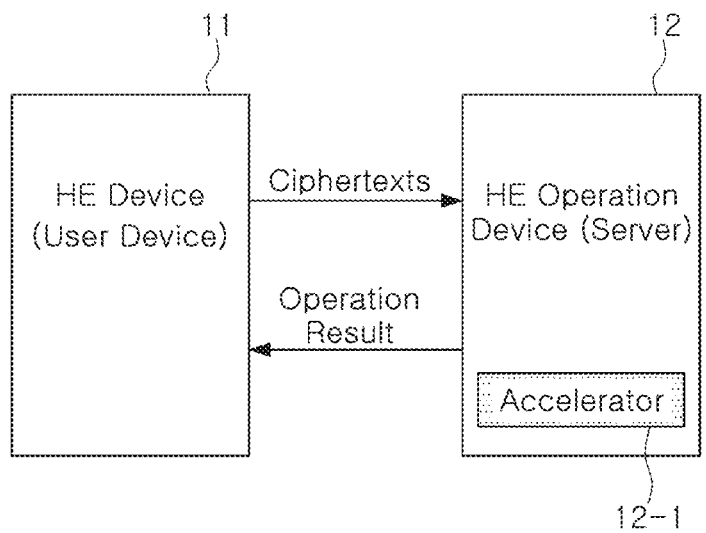
FIG. 1 is a diagram illustrating a homomorphic encryption system according to some example embodiments.

FIG. 1 is a diagram illustrating a homomorphic encryption system 10 according to some example embodiments. Referring to FIG. 1, the homomorphic encryption system 10 may include a homomorphic encryption device 11 and a homomorphic encryption operation device 12.

The homomorphic encryption device 11 may be implemented to convert plaintext into ciphertext or ciphertext into plaintext using a homomorphic encryption algorithm. In some example embodiments, the homomorphic encryption device 11 may be a user device. For example, the user device may be various electronic devices. Here, the electronic device may include a storage device, a portable communication device (for example, a smartphone), a computer device, a portable multimedia device, a portable medical device, a camera, a wearable device, or a home appliance device. In particular, the electronic device may be applicable to an intelligent service (for example, a smart home, a smart city, a smart car, or health care) based on a wireless communication technology and an Internet of Things (IoT)-related technology.

The homomorphic encryption operation device 12 may include a homomorphic encryption operation accelerator 12-1 performing an operation on ciphertexts transmitted from the homomorphic encryption device 11. In some example embodiments, the homomorphic encryption operation device 12 may be a server. For example, the server may provide a cloud service or an ultra-low latency service using distributed computing or mobile edge computing. In particular, the server may be an intelligent server using machine learning/neural networks. The homomorphic encryption operation device 12 may include an approximation operation circuit. Here, the approximation operation circuit may be implemented to provide an approximation operation so as to perform a search operation in homomorphic encryption.

The homomorphic encryption operation accelerator 12-1 may be implemented to efficiently parallelize a number theoretic transform (NTT) operation and a base conversion (BaseConv) operation, which occupy most of time related to a homomorphic encryption operation. Here, the NTT operation may refer to transformation of data to simplify complexity of polynomial multiplication of a homomorphic ciphertext. Here, the BaseConv operation may refer to conversion of a base set on an NTT domain into a base set on a residue number system (RNS). Accordingly, overall time required to perform the homomorphic encryption operation may be reduced.

In addition, the homomorphic encryption operation accelerator 12-1 may be implemented to perform an operation through a hierarchical register file (RF) structure when the BaseConv operation is performed.

In general, homomorphic encryption may be an encryption methodology using a computational challenge referred to as learning with errors (LWE). In the homomorphic encryption, an operation may be applicable to ciphertext, encrypted data, without a user having to perform decryption. The homomorphic encryption may be classified according to an encryption method and a type of operation supported. In homomorphic encryption systems such as CKKS, BFV, and FV, ciphertext may be represented by a polynomial pair a(X) and b(X) on a polynomial ring $R_Q=Z_Q[X]/(X^N+1)$. The polynomial ring $R_Q$ may refer to a set having a plaintext space that is a real number among sets closed for addition and multiplication. $Z_Q$ may be a coefficient, and N may be a degree.

A polynomial $m(X)=\Sigma c_{N-1}X^{N-1}$ on a polynomial ring $R_Q$ may be a polynomial in which a coefficient $c_i$ of each term is an integer less than Q, and a highest order term is N−1 (where N is a natural number) or less. Here, Q may be a big integer requiring thousands of bits of precision.

When a coefficient is greater than Q through an operation between different polynomials on the polynomial ring $R_Q$, a magnitude of the coefficient may need to be maintained to be less than Q through a modular operation using Q as a divisor. In this case, according to N corresponding to the degree of the polynomial ring $R_Q$, a maximum of N/2 complex numbers may be packed in one ciphertext. Here, packing may refer to encryption of a plurality of messages into one ciphertext. In this case, precision of an individual complex number may be data of about several tens of bits, and a magnitude of the data may be increased several tens of times by an encryption process.

When there are relative prime integers $p_1, p_2, p_3, \ldots, p_k$, using a Chinese remainder theorem (CRT), an integer (Z) satisfying $$Z < \prod_{1 \le t \le k} p_t$$

may be uniquely represented by remainders obtained by dividing the integer (Z) by $p_1, p_2, p_3, \ldots, p_k$. In this case, the used relative prime integers $p_1, p_2, p_3, \ldots, p_k$ may be referred to as bases. Many homomorphic encryption systems may use the CRT so as to reduce computational complexity of ciphertexts requiring big-integer computation.

Coefficients of a polynomial represented on the polynomial ring $R_Q$ through the CRT may be represented by $R_q$, which are polynomials of remainders obtained by performing division through bases belonging to $q_0, q_1, \ldots q_l$. A representation of the remainder may be referred to as an RNS representation. Thus, an operation between polynomials on the polynomial ring $R_Q$ may be changed to an operation between polynomials on the same polynomial $R_{q_i}$. In this case, a polynomial on each $R_{q_i}$ may be referred to as a residual polynomial. Coefficients of the polynomials may be numbers less than or equal to $q_i$. Accordingly, $q_i$ may be set to a number of 64 bits or less that is friendly to a general computing platform. As a result, computational overhead from big-integers may be reduced.

In general, multiplication between different polynomials $a(X)=a_0+\ldots+a_{N-1}X^{N-1}+a_1X+a_2X^2$ and $b(X)=b_0+b_1X\ldots b_{N-1}X^{N-1}$ on a polynomial ring $R_{q_i}$ may be performed in the form of a convolution with a computational complexity of $O(N^2)$. NTT may be a type of discrete Fourier transform (DFT) defined within a finite field of a polynomial ring. As a result of performing multiplication between the two preceding polynomials $a(X)$ and $b(X)$ using an NTT operation and an inverse NTT (iNTT) operation that is an inverse process of the NTT operation, $c(X)$ may be computed as shown in Equation 1.

$$c(X)=iNTT(NTT(a(X))\odot NTT(b(X)))$$ [Equation 1]

Here, $\odot$, an element-wise multiplication operation, may be an operator instructing multiplication between terms at the same position. In this case, an individual NTT/iNTT process may be performed with a complexity of $O(N\log N)$ by applying fast Fourier transform (FFT) in the same manner as DFT/inverse DFT (IDFT). Accordingly, polynomial multiplication on a polynomial ring $R_{q_i}$ using NTT/iNTT may be performed with a complexity of $O(N\log N)$. Such NTT transformation may also be applicable to an RNS representation of a polynomial. A result of the transformation may be referred to as a representation on an NTT domain. A representation on an NTT domain of a polynomial belonging to the polynomial ring $R_{q_i}$ may be a sequence of N integers less than $q_i$.

In general, fast base conversion (FBC) may perform a base used for the CRT without going through a big integer. In order to change a base of the RNS representation to another base without using the FBC, the base of the RNS representation may need to be converted into an original big integer through inverse CRT (iCRT) conversion, and the base converted into the big integer may need to be CRT-converted into new bases. Such a type of base conversion may require a modular operation on a big integer, and thus may have high complexity.

The FBC may perform such base conversion within the RNS representation. An RNS representation using an integer of $C_l=\{q_0, q_1, \ldots q_l\}$ as a base may be converted into an RNS representation using as $B=\{p_0, p_1, \ldots p_k\}$ a base, as shown in Equation 2.

$$BConv_{C_l\to B}([a(X)C_l) = \left\{\left[\underbrace{\sum_{j=0}^{l}[[a(X)]q_j\cdot \hat{q}_j^{-1}]_{q_j}\cdot \hat{q}_j}_{(1)}\right]_{p_i}\right\}_{0\le i<k}$$ [Equation 2]

Here, $[\alpha]_{C_l}$ may refer to an RNS representation of a in which a base set is represented using C. $[\cdot]_{q_j}$ it may be a remainder polynomial when $a(X)$ is CRT-converted using $q_j$ as a base. $\hat{q}_j$ may be a product of remainders excluding $q_j$ among bases in a base set C. Accordingly, $\hat{q}_j^{-1}$ may be a multiplicative inverse of $\hat{q}_j$.

Ciphertext that is CRTed with a base set $C=\{q\_0, q\_1, \ldots, q\_l\}$, and has each remainder polynomial on which NTT is performed may be represented in the form of a matrix of $\ell \times N$. In this case, a multiplication operation between ciphertexts may be performed with an iNTT/NTT operation, a BaseConv operation, and detailed operations of element-wise multiplication and addition. Among detailed operation patterns, the iNTT/NTT operation and the BaseConv operation may have relatively high computational complexity compared to that of an element-wise operation, and thus may occupy most of homomorphic encryption operation time.

All arithmetic operations between polynomials included in ciphertext may be performed as an element-wise operation on an NTT domain. In a general homomorphic encryption implementation, the ciphertext may be placed and used on the NTT domain. However, the BaseConv operation may be an operation changing a base set on an RNS representation, and thus conversion from a representation on the NTT domain into the RNS representation may be required or desired. Accordingly, a detailed operation execution pattern of iNTT-BaseConv-NTT may be repeatedly shown in the homomorphic encryption operation. In this case, the NTT/iNTT operation may be performed in reminder polynomial units, and thus N data corresponding to a row direction of a matrix may be computed and output at once. Conversely, the BaseConv operation may require l data corresponding to the same coefficient position in a remainder polynomial. Thus, in order to perform the BaseConv operation as shown in Equation 2, all iNTT operations on the remainder polynomial may need to be performed. Thus, there may be dependency that needs to preserve an execution order between executions of the iNTT operation and the BaseConv operation.

In general, single instruction multiple data (SIMD) may be one of schemes for parallel processing of operations. The SIMD may perform simultaneous operation on multiple data with one instruction. In the same manner as a multiplication process generating values that are accumulated in a process of multiplication and accumulation, the operations may be performed independently of each other. The SIMD may be a parallel processing scheme that is frequently used when the same operation is performed regardless of data being computed. For the SIMD, operation accelerators may need to be arranged in parallel. In this case, each of the operation accelerators may be referred to as a SIMD lane.

In general, an operation between ciphertexts may require a long operation time because complexity of the operation increases as a size of ciphertext increases, and additional detailed operations are required or desired. Thus, for practical use of homomorphic encryption, it may be necessary to accelerate the homomorphic encryption operation. Sequentially performing operations that require a long time, such as iNTT/NTT and BaseConv, may adversely affect overall execution time. The homomorphic encryption operation accelerator according to some example embodiments may efficiently accelerate the homomorphic encryption operation through a method of performing the iNTT/NTT operation and the BaseConv operation in parallel and a memory structure specialized therefor.

A sequential execution process of the iNTT operation and the BaseConv operation may be converted into a process of deriving a partial sum from a summation process (sum in Equation 2) required or desired for the BaseConv operation, and adding the derived partial sum. Equation 3 below may be an equation when a process of Equation 2 is computed through the partial sum.

[Equation 3]

$$BConv_{C_\ell \to B}([a(X)C_\ell]) = \left\{ \sum_{j_1=0}^{(\ell+1)/\ell_{sub}-1} \left[ \sum_{j_2=j_1 \times \ell_{sub}}^{(j_1+1) \times \ell_{sub}^{-1}} [[a(X)]_{j_2} \cdot \hat{q}_{j_2}^{-1}]_{q_{j_2}} \cdot \hat{q}_{j_2} \right]_{pi} \right\}_{0 \le i < k}$$

Here, a partial sum of a BaseConv operation on $\ell_{sub}$ remainder polynomials may be computed first (inner side $\Sigma$ of Equation 3). Thereafter, a process of adding such partial sums may be performed (outer side $\Sigma$ of Equation 3). For a summation in the above-described manner, a BaseConv operation on the $\ell_{sub}$ remainder polynomials may be performed in parallel with next $\ell_{sub}$ iNTT operations.

The homomorphic encryption operation accelerator according to some example embodiments may efficiently perform the partial sum of the BaseConv operation. In a process of generating the above-described partial sums, operations on different bases may be independently performed.

The homomorphic encryption operation accelerator according to some example embodiments may perform an efficient operation through parallelization in a SIMD manner. The homomorphic encryption operation accelerator according to some example embodiments may be implemented by arranging lanes for performing $\ell$ multiplication operations, and accumulating results of performing the multiplication operations on each lane. A register file (RF) may be disposed to provide data to be computed for each lane. A process of multiplying $\hat{q}_{j2}^{-1}$ may be performed through a process of multiplying the $\ell_{sub}$ remainder polynomials by $\hat{q}_{j2}^{-1}$, and a process of performing repetition as many times as $p_i$. Thus, the register file (RF) may store $[[a(X)]_{j2} \cdot \hat{q}_{j2}^{-1}]_{q_{j2}}$, which may be used for a summation operation on all $p_i$.

Figure 2:
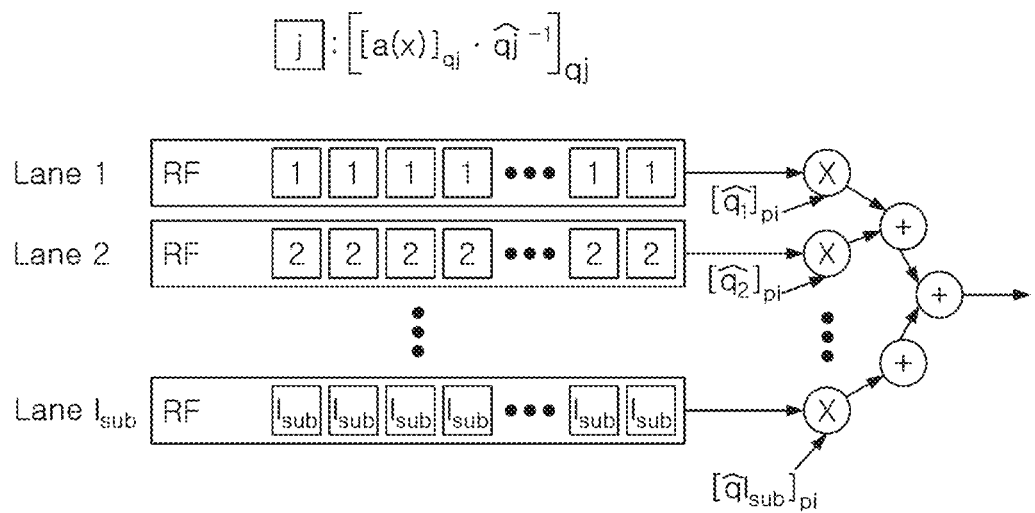
FIG. 2 is a diagram illustrating a data layout when a method of arranging a register file in each lane and storing polynomials corresponding to different bases in each register file is used.

FIG. 2 is a diagram illustrating a data layout when a method of arranging a register file in each lane and storing polynomials corresponding to different bases in each register file is used. As illustrated in FIG. 2, when a data layout is arranged in a register file (RF) for each lane and polynomials corresponding to different bases are stored in each register file (RF), a BaseConv operation process is performed by transferring data of each register file (RF) to a multiplier. In addition, when a remainder of the same coefficient is arranged at the same position in the register file (RF), data in a vertical line is output, and thus indexing may be simple. As the operation proceeds, data of each remainder polynomial may be evenly exhausted so that the operation is completed.

In this manner, as soon as the operation on the $\ell_{sub}$ remainder polynomials is completed, an operation on next $\ell_{sub}$ remainder polynomials may need to be performed so that the operation is performed in a shortest time. As described above, the $\ell_{sub}$ remainder polynomials may need to be stored in the register file (RF) at a time point when the operation is completed. When a BaseConv operation is performed with the above-described layout, results of performing an iNTT operation may be sequentially output for each remainder polynomial. Conversely, the data consumed by the BaseConv operation may be evenly consumed in all the remainder polynomials participating. It may be difficult to arrange a following remainder polynomial with the same layout in the register file (RF) being used during an operation execution process. Such an issue may be resolved through a double buffering method of receiving, storing, and using data during operation by re-arranging other $\ell_{sub}$ RFs. The double buffering method may be easily applicable, but may cause the number of RFs to double.

Figure 3:
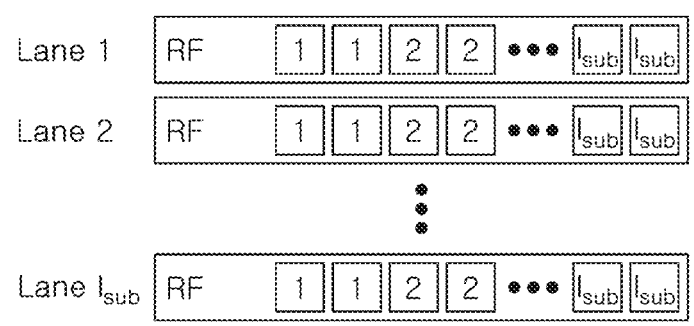
FIG. 3 is a diagram illustrating a data layout when remainder polynomials for one base are evenly arranged in an entire register file.

FIG. 3 is a diagram illustrating a data layout when remainder polynomials for one base are evenly arranged in an entire register file (RF). In order to prevent or hinder the register file (RF) from being excessively increased when the double buffering method is used, the $\ell_{sub}$ remainder polynomials may be evenly arranged in the entire register file (RF) in the same manner, as illustrated in FIG. 3. When an arrangement is performed in this manner, individual remainder polynomials may be evenly arranged in each register file (RF). In addition, exhausted data may be evenly consumed in each register file (RF), and thus an issue associated with the above-described arrangement may disappear.

When the data layout is changed as illustrated in FIG. 3, an operation may not be performed in such a manner that data positioned in the same vertical line in an individual register file (RF) is taken out and transferred to an operation accelerator, and thus complex indexing may be required or desired. A homomorphic encryption operation device according to some example embodiments may additionally use an additional transposing unit and a relatively small register file (RF) so as to avoid such complex indexing. The existing register file (RF) may be classified as a level 0 RF (first level register file), and the relatively small-sized register file (RF) received through the transposing unit may be classified as a level 1 RF (second level register file).

Figure 4:
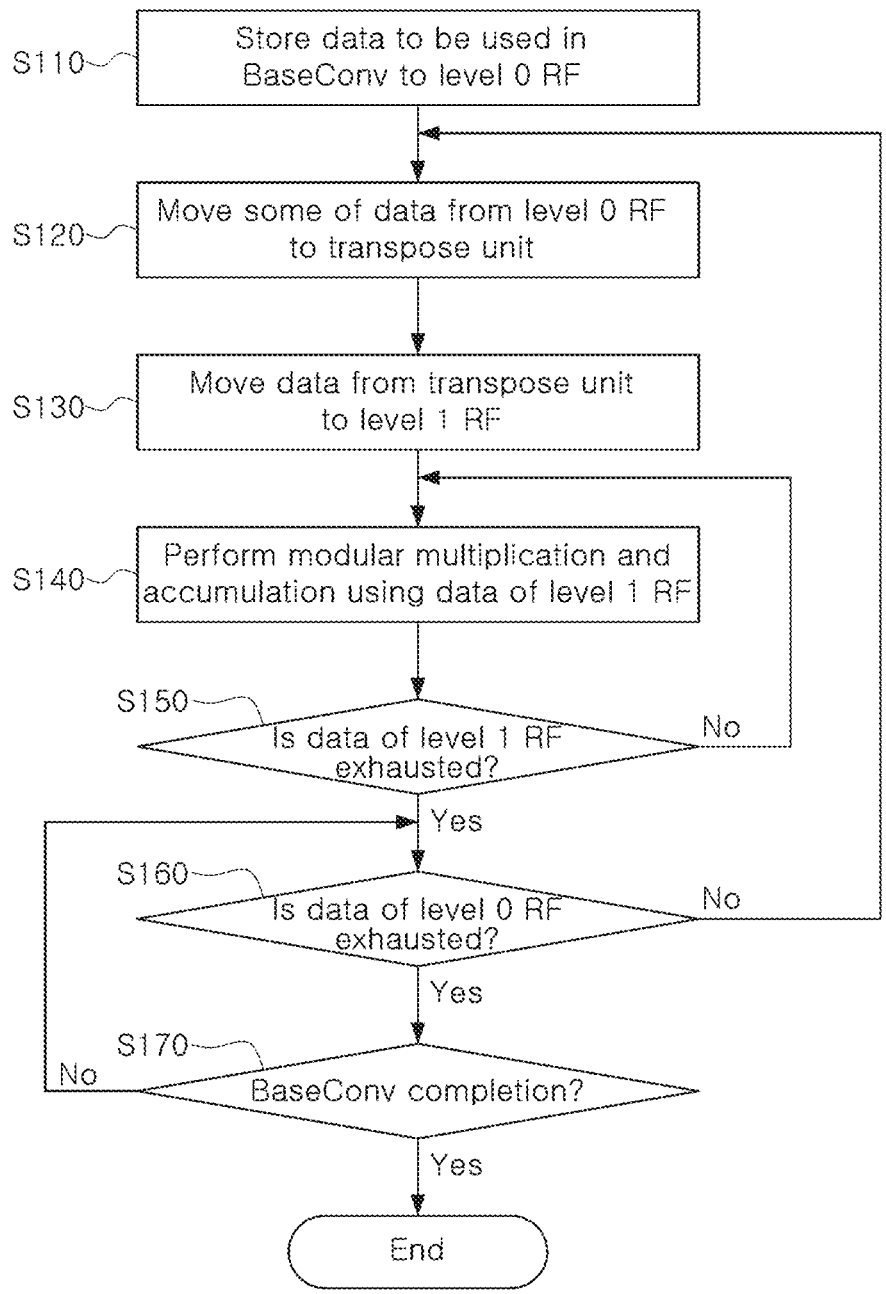
FIG. 4 is a flowchart illustrating a computation process of a modular multiplier and an accumulation unit having a hierarchical register file according to some example embodiments.
Figure 5:
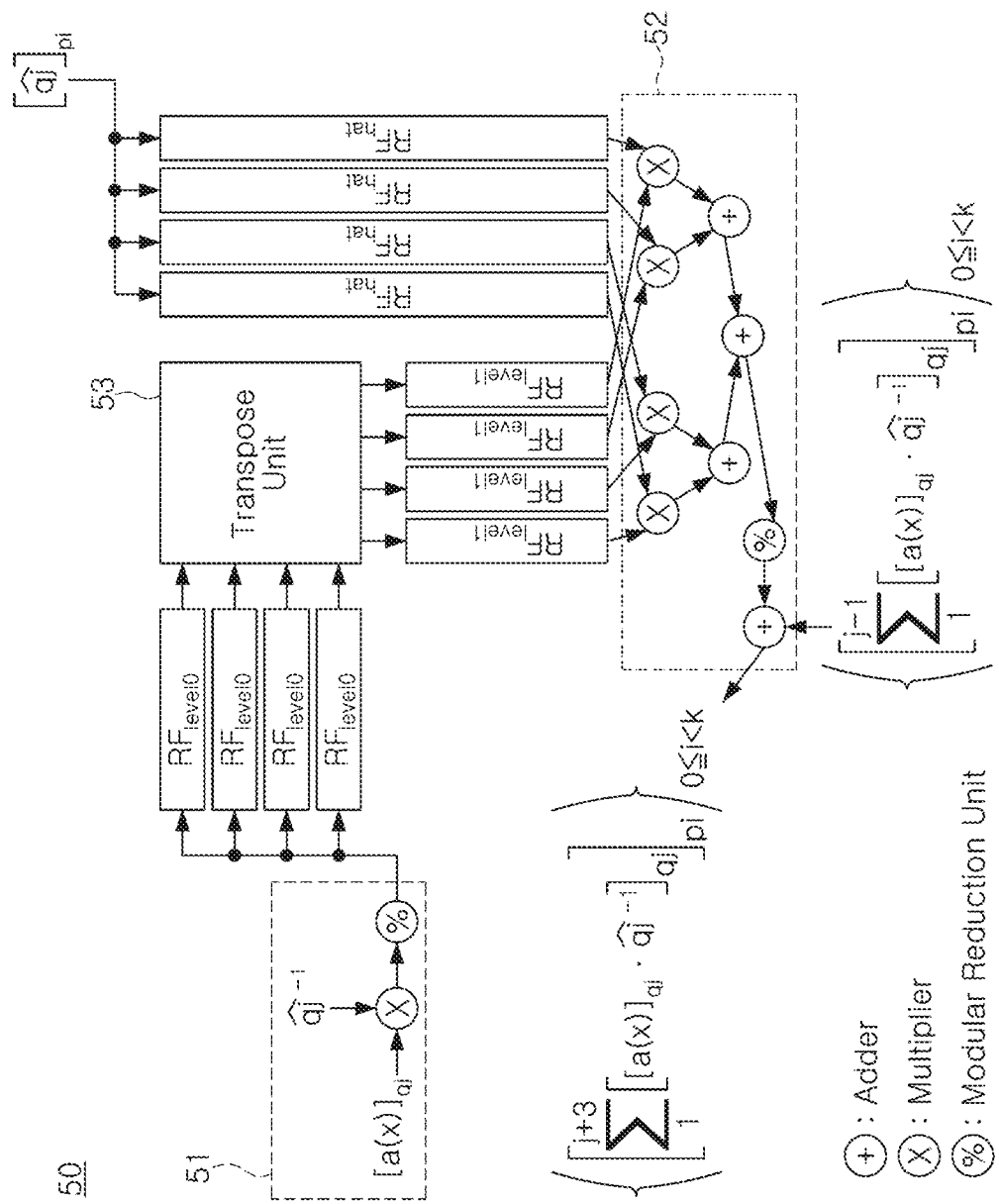
FIG. 5 is a diagram illustrating a modular multiplication and accumulation operation accelerator supporting a hierarchical register file for a BaseConv operation according to some example embodiments.

FIG. 4 is a flowchart illustrating a computation process of a modular multiplier and an accumulation unit having a hierarchical register file according to some example embodiments. Referring to FIGS. 4 and 5, a process in which a modular multiplication and accumulation operation accelerator using a first level (level 0) hierarchical register file (RF) and a second level (level 1) hierarchical register file (RF) performs an operation may be performed as follows.

When data for multiplication and accumulation are input into a homomorphic encryption operation accelerator, the data may be sequentially stored in an order of being input into a relatively large first level register file (level 0 RF) (S110). Data stored in the level 0 RF may be sequentially moved to a transposing unit 53 (S120). The data stored in the transposing unit 53 may be moved to a second level register file (level 1 RF) (S130). With respect to data in the level 1 RF, a partial sum operation on all $p_i$ may be completed. For example, a modular multiplication and accumulation operation may be performed using the data in the level 1 RF (S140). Until all the data in the level 1 RF is exhausted, operation S140 may be repeated (S150).

If, after all the data in the level 1 RF is exhausted, a process of bringing data back from level 0 RF may be repeated until data in level 0 RF is exhausted. For example, operations S120 to S150 may be repeated until the data in the level 0 RF is exhausted (S160). Finally, it may be determined whether all BaseConv operations are completed (S170). Thereafter, stand-by may be performed until the BaseConv operations are completed or new data comes to the first level register file (level 0 RF).

The homomorphic encryption operation device according to some example embodiments may include an operation accelerator accelerating a modular multiplication and an accumulation process in a BaseConv operation process during a homomorphic encryption operation process. The operation accelerator may obtain an operation acceleration effect in a SIMD manner. In addition, an efficient data layout considering an operation pattern and a hierarchical register file (RF) structure suitable therefor may be used, thereby performing an operation without a complicated indexing process.

In addition, the homomorphic encryption operation accelerator according to some example embodiments may reduce an amount of energy consumed in the operation process through the hierarchical register file (RF) structure. A storage unit, such as a register file (RF), may generate additional energy consumption each time stored data is accessed. The energy consumed by the storage unit in the operation process may be proportional to the number of accesses. In addition, as a size of the storage unit used is larger, the energy consumed for a single access may be greater. A relatively small-sized level 1 register file (RF) may be accessed through the hierarchical register file (RF) structure according to some example embodiments in a data reuse situation, and thus energy consumption generated by the entire storage unit may be reduced.

FIG. 5 is a diagram illustrating a BaseConv operation unit 50 according to some example embodiments. The BaseConv operation unit 50 may be implemented to perform a modular multiplication and accumulation operation supporting a hierarchical register file (RF). The BaseConv operation unit 50 may be an operation accelerator specialized to perform a BaseConv operation in parallel with a preceding iNTT operation through the method of Equation 3. The BaseConv operation unit 50 may include first level RFs $RF_{level0}$, second level $RF_{level1}$, additional RFs $RF_{bat}$, a modular multiplier 51, a modular accumulator 52, and a transposing unit 53.

The modular multiplier 51 illustrated in FIG. 5 may compute $[[a(X)]_j \cdot \hat{q}_j^{-1}]_{q_j}$ and distribute a result of the computation to $RF_{level0}$. Thus, data may be arranged in the manner illustrated in FIG. 3.

The transposing unit 53, a shift register, may have a form in which storage units are arranged in a grid of the number of lanes×the number of lanes. The shift register may store one piece of data. Depending on the situation, data may be transferred to the shift register connected in a traverse or longitudinal direction. Data transfer may be performed with directionality. For example, data transfer may be performed from left to right or from top to bottom. The transposing unit 53 may be arranged in a traverse direction of $RF_{level0}$, and may be implemented to receive data to be computed from a register file (RF).

Figure 6:
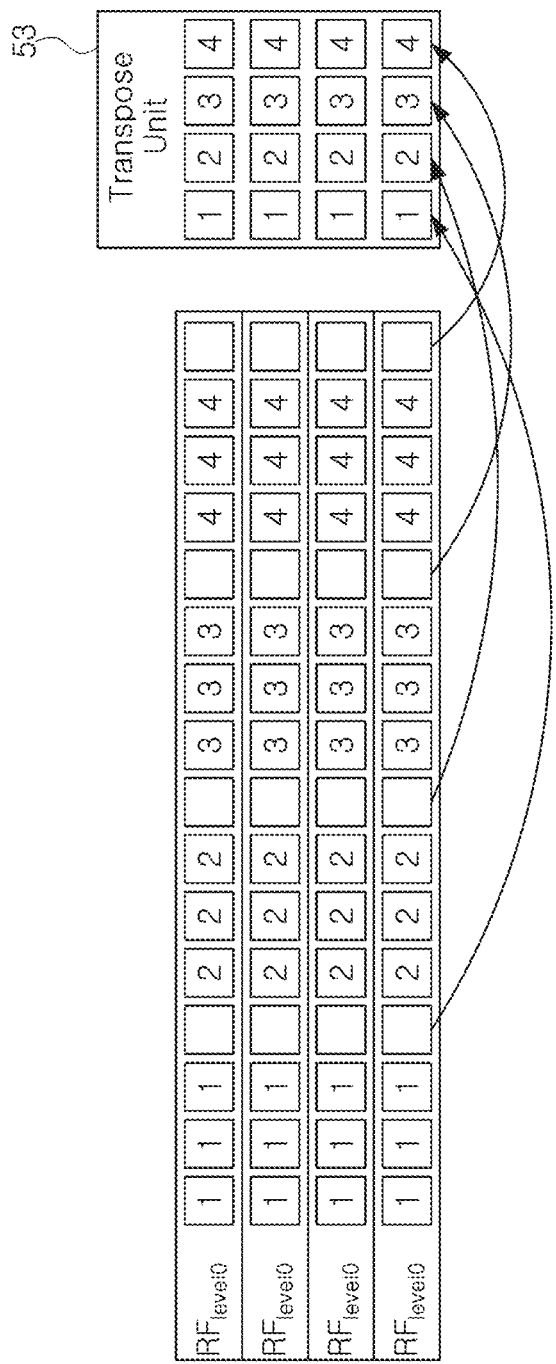
FIG. 6 is a diagram illustrating data transfer from a register file to a transposing unit.

FIG. 6 is a diagram illustrating data transfer from the transposing unit 53 from a register file $RF_{level0}$. Referring to FIG. 6, the same coefficients of different bases on $RF_{level0}$ may be transferred to the transposing unit 53, and thus may be arranged.

After an arrangement is performed as illustrated in FIG. 6, data in the transposing unit 53 may move from top to bottom to be transferred to $RF_{level1}$. With respect to the transferred data, different RFs of $RF_{level1}$ may have a value of $[[a(X)]_j \cdot \hat{q}_j^{-1}]_{q_j}$ for different bases. Accordingly, a register file (RF) designated for each lane may transfer data to a multiplier in the modular accumulator 52 illustrated in FIG. 5. $[\hat{q}_j]_{pi}$ may be stored in a register file (RF) before all operations are performed. In the same manner as $RF_{level1}$, data may be transferred to a multiplier of a designated lane. The modular accumulator 52 illustrated in FIG. 5 may perform a modular operation on results accumulated by multiplication of $RF_{level1}$ and $RF_{bat}$ an adder that is in a tree format.

Example embodiments may be applicable to acceleration of operations of all homomorphic encryption systems in which a modular multiplication and accumulation process is used.

The homomorphic encryption operation accelerator according to some example embodiments may include a key switching module, a mode up circuit, a modular multiplier, and a mode down circuit. Here, each of the mode up circuit and the mode down circuit may include an NTT/iNTT operation and a BaseConv operation.

In the NTT/iNTT operation, N data corresponding to rows of a matrix may be computed and output at once. The BaseConv operation may requires column data corresponding to the same coefficient position in a remainder polynomial. There may be dependency between the iNTT operation and the BaseConv operation. The homomorphic encryption operation accelerator according to some example embodiments may be implemented to perform the BaseConv operation in parallel with a preceding iNTT operation. Here, the BaseConv operation may refer to computing a partial sum by performing iNTT in units of $\ell_{sub}$. In some example embodiments, $\ell_{sub}$ may be determined depending on an operating frequency/memory size. In addition, remainder polynomials may be evenly arranged in an entire RF, and thus individual remainder polynomials may also be evenly arranged in each RF. Accordingly, data consumed in the partial sum operation may be evenly consumed in each RF. In addition, the homomorphic encryption operation accelerator according to some example embodiments may be implemented in a modular multiplication and accumulation operation accelerator structure supporting a hierarchical RF for the BaseConv operation.

Figure 7:
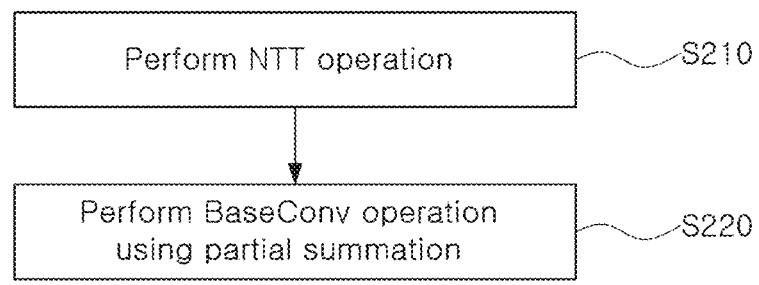
FIG. 7 is a flowchart illustrating a method of operating a homomorphic encryption operation device according to some example embodiments.

FIG. 7 is a flowchart illustrating a method of operating a homomorphic encryption operation device 12 according to some example embodiments. Referring to FIG. 7, an operation of the homomorphic encryption operation device 12 may be performed as follows.

The homomorphic encryption operation device 12 may perform an NTT operation so as to reduce complexity of a modular multiplication operation (S210). Here, the NTT operation may include a first NTT operation on a first polynomial, a second NTT operation on a second polynomial, an element-wise multiplication operation on a value obtained by performing the first NTT operation and a result of performing the second NTT operation, and an iNTT operation on a result of performing the element-wise multiplication operation. The homomorphic encryption operation device 12 may perform a BaseConv operation using a partial sum while performing the NTT operation (S220).

In some example embodiments, the partial sum for the base conversion operation on a desired (or alternatively, a predetermined) number of polynomials may be derived. In some example embodiments, while the partial sum is derived, a following desired (or alternatively, a predetermined) number of NTT operations may be performed in parallel. In some example embodiments, the NTT operation and the BaseConv operation may be performed through parallelization in a SIMD manner. In some example embodiments, the BaseConv operation may be performed on a plurality of lanes for which $\ell$ (an integer greater than or equal to 2) multiplication operations are performed, and a corresponding register file may be arranged in each of the plurality of lanes. In some example embodiments, the desired (or alternatively, a predetermined) number of remainder polynomials may be evenly arranged in an entire register file.

In some example embodiments, the BaseConv operation may sequentially move data of a first level register file to a second level register file through a transposing unit, complete a partial sum operation on data of the second level register file, and perform a modular multiplication and accumulation operation using the data of the second level register file. In some example embodiments, the BaseConv operation may repeat the modular multiplication and accumulation operation on the data of the second level register file until the data of the first level register file is exhausted.

Figure 8:
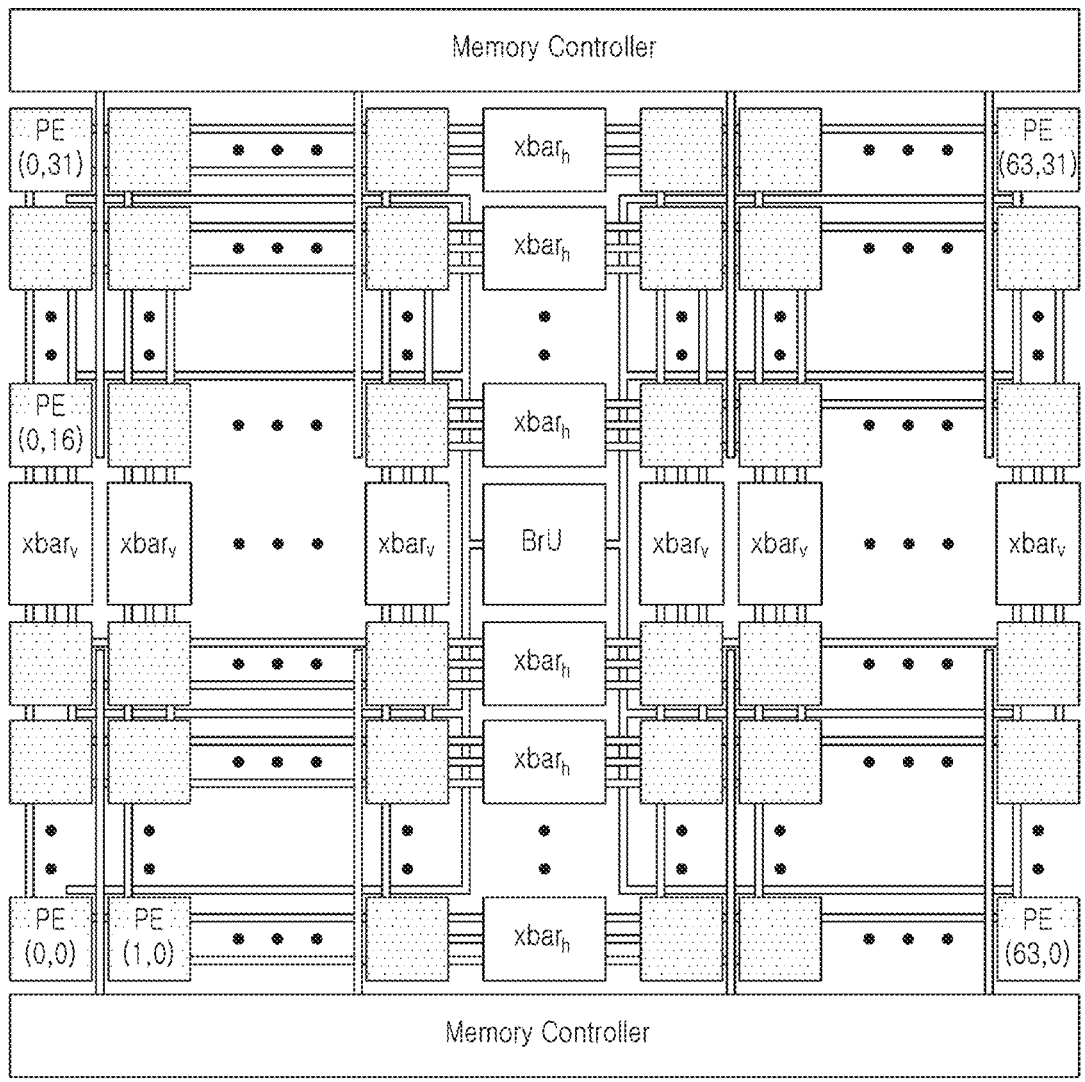
FIG. 8 is a diagram illustrating a homomorphic encryption operation accelerator according to some example embodiments.

FIG. 8 is a diagram illustrating a homomorphic encryption operation accelerator according to some example embodiments. Referring to FIG. 8, the homomorphic encryption operation accelerator 90 may include a plurality of processing units PEs, a broadcast unit BrU, a plurality of horizontal crossbars $xbar_h$, and a plurality of vertical crossbars $xbar_v$.

Figure 9:
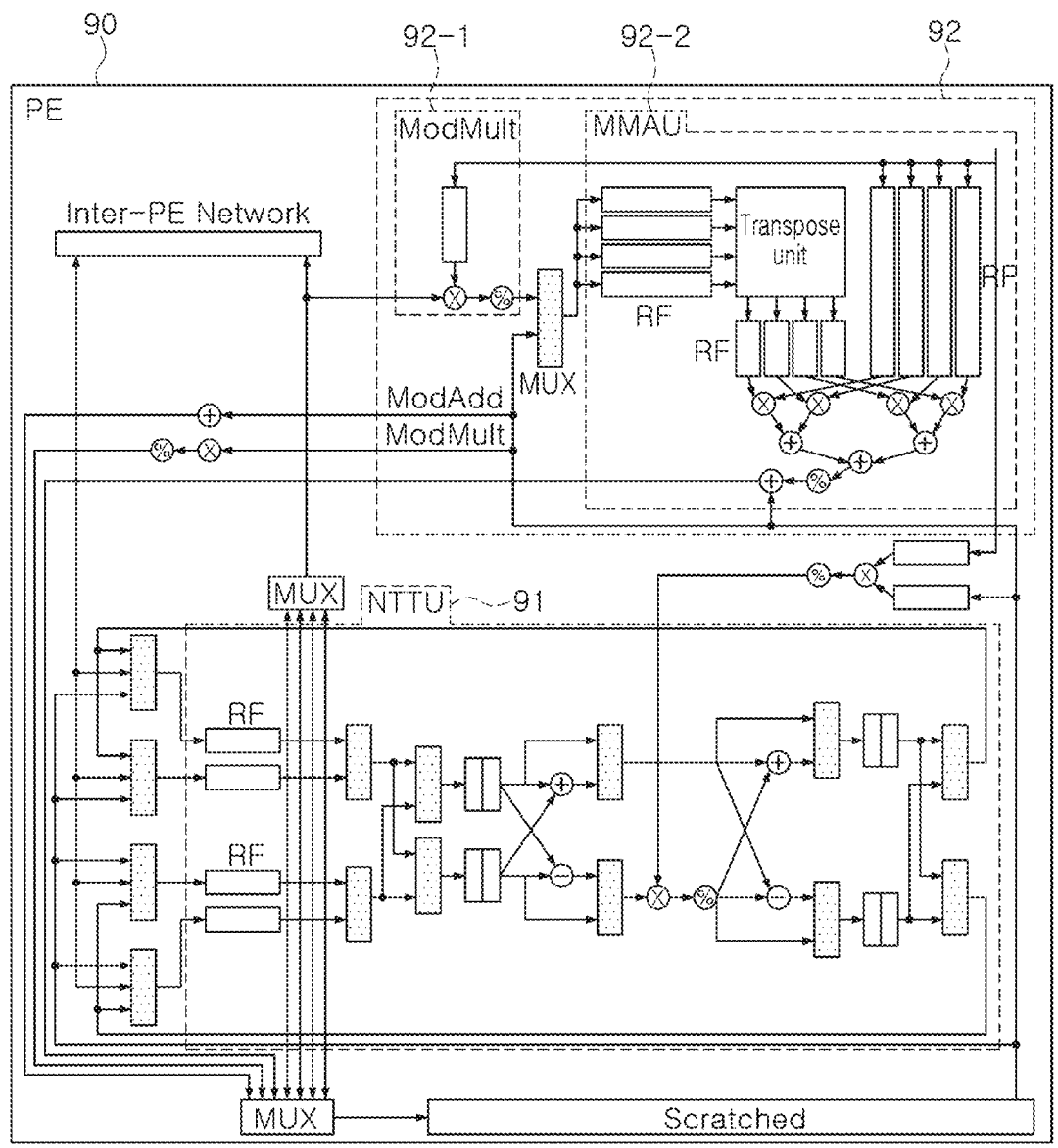
FIG. 9 is a diagram illustrating an example embodiment of the processing unit illustrated in FIG. 8.

FIG. 9 is a diagram illustrating some example embodiments of the PE illustrated in FIG. 8. Referring to FIG. 9, a PE 90 may include an NTT unit 91 and a BaseConv unit 92. The BaseConv unit 92 may include a modular multiplier 92-1 and a modular accumulator 92-2.

The NTT unit 91 may be implemented to perform a first NTT operation on a first polynomial, perform a second NTT operation on a second polynomial, and perform an element-wise multiplication operation on a value obtained by performing the first NTT operation and a result of performing the second NTT operation. The BaseConv unit 92 may be implemented in the same manner as the BaseConv unit 50 described with reference to FIGS. 5 and 6.

Figure 10:
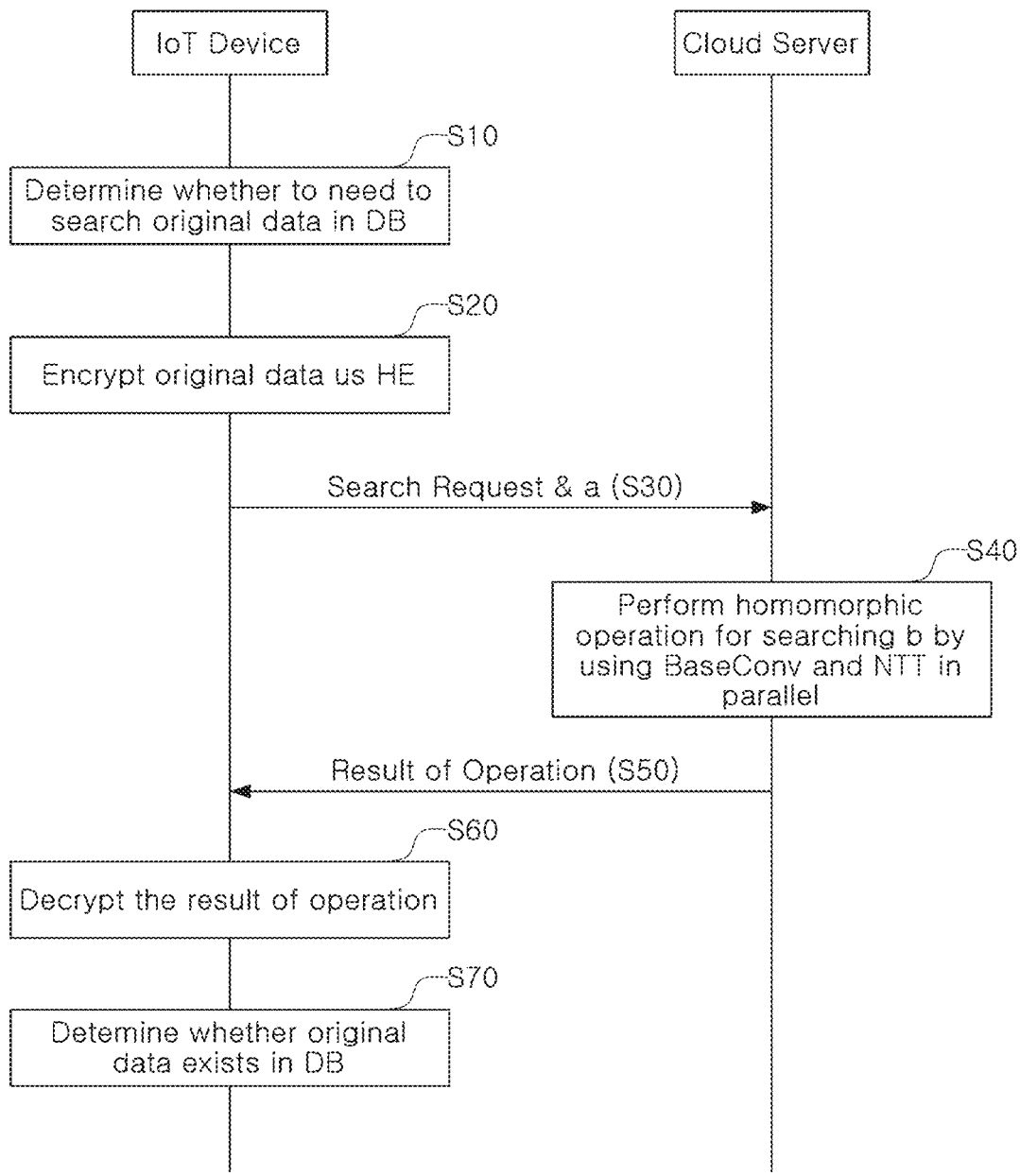
FIG. 10 is a ladder diagram illustrating a method of operating a cloud system according to some example embodiments.

FIG. 10 is a ladder diagram illustrating a method of operating a cloud system according to some example embodiments. Referring to FIG. 10, the cloud system may be operated as follows. An IoT device may determine whether it is required to search whether original data exists in a database of a cloud server (S10). If a search is required, the IoT device may encrypt, based on a homomorphic encryption algorithm, the original data (S20). The IoT device may transmit, to the cloud system, a search request together with the encrypted data (a) (S30).

In order to search the original data in response to the search request, the cloud server may perform a homomorphic encryption operation while performing an NTT operation and a BaseConv operation in parallel on received encrypted data, that is, a first ciphertext (a), and encrypted data stored in the server, that is, a second ciphertext (b) (S40). The cloud server may transmit, to the IoT device, a result value of the homomorphic encryption operation (S50). The IoT device may receive the result value and decrypt the result value based on the homomorphic encryption algorithm (S60). The IoT device may determine whether the original data exists in the database of the cloud server using the decrypted value (S70).

A user device according to some example embodiments may be a smart storage device.

Figure 11:
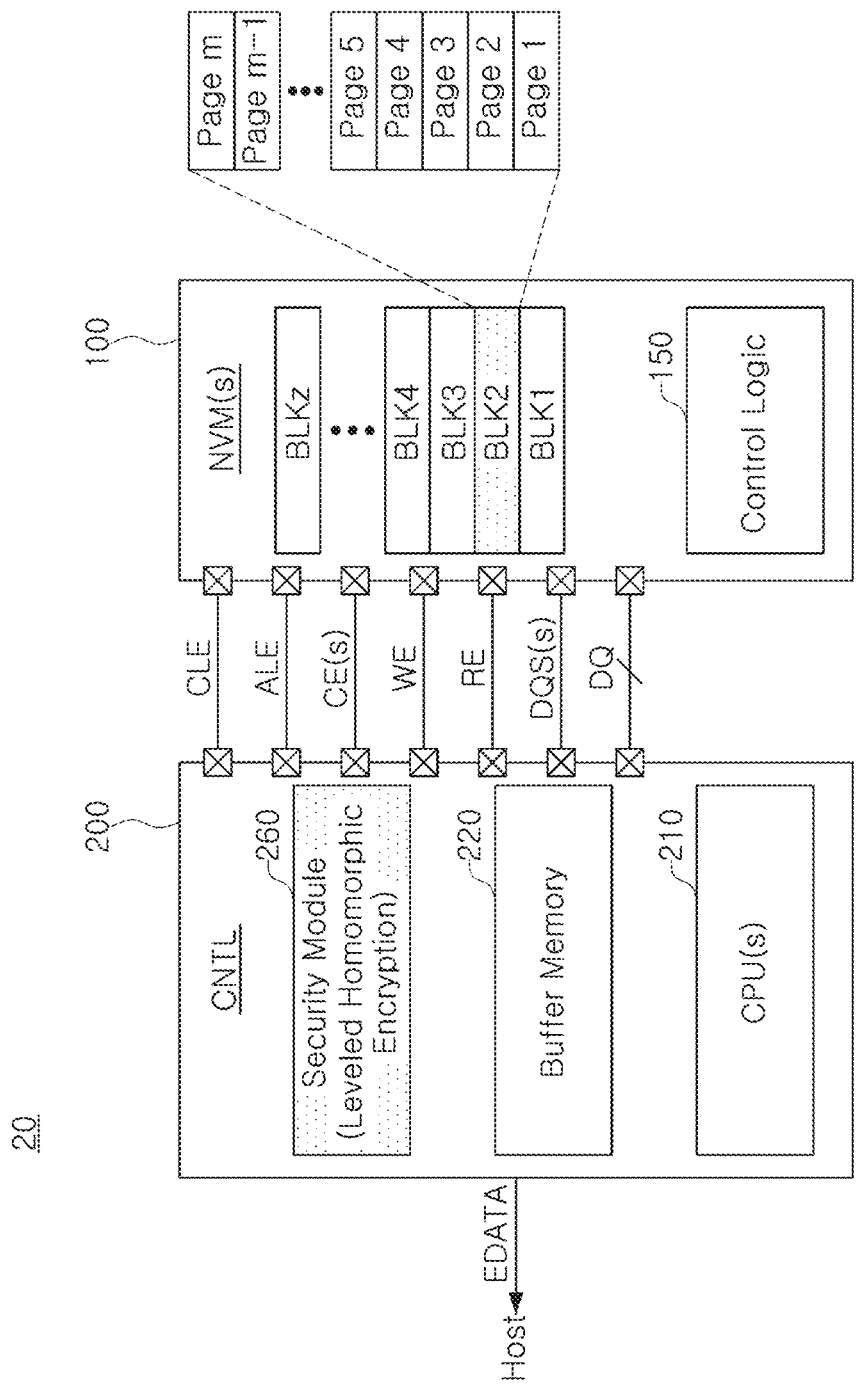
FIG. 11 is a diagram illustrating a storage device according to some example embodiments.

FIG. 11 is a diagram illustrating a storage device 20 according to some example embodiments. Referring to FIG. 11, the storage device 20 may include at least one nonvolatile memory device (NVM(s)) 100 and a controller (CNTL) 200.

At least one nonvolatile memory device 100 may be implemented to store data. The nonvolatile memory device 100 may include a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In addition, the nonvolatile memory device 100 may be implemented in a three-dimensional array structure. Example embodiments may be applicable to a flash memory device in which the charge storage layer is configured as a conductive floating gate, and also to a charge trap flash (CTF) in which a charge storage layer is configured as an insulating film. Hereinafter, the nonvolatile memory device 100 is referred to as a vertical NAND flash memory device (VNAND) for ease of description.

In addition, the nonvolatile memory device 100 may be implemented to include a plurality of memory blocks BLK1 to BLKz (where z is an integer equal to or greater than 2) and a control logic 150. Each of the plurality of memory blocks BLK1 to BLKz may include a plurality of pages Page 1 to Page m (where m is an integer equal to or greater than 2). Each of the plurality of pages Page 1 to Page m may include a plurality of memory cells. Each of the plurality of memory cells may store at least one bit.

The control logic 150 may receive a command and an address from the controller (CNTL) 200, and may perform an operation (a program operation, a read operation, an erase operation, or the like) corresponding to the received command on memory cells corresponding to the address.

The controller 200 (CNTL) may be connected to at least one nonvolatile memory device 100 through a plurality of control pins for transmitting control signals (for example, CLE, ALE, CE(s), WE, RE, or the like). In addition, the controller 200 (CNTL) may be implemented to control the nonvolatile memory device 100 using control signals (CLE, ALE, CE(s), WE, RE, or the like). For example, the nonvolatile memory device 100 may latch a command or an address on an edge of a write enable (WE)/read enable (RE) signal according to a command latch enable (CLE) signal and an address latch enable (ALE) signal, so that program operation/read operation/erase operation may be performed. For example, during a read operation, the chip enable signal CE may be activated, CLE may be activated during a command transmission period, ALE may be activated during an address transmission period, and RE may be toggled during a period in which data is transmitted through a data signal line DQ. A data strobe signal DQS may be toggled with a frequency corresponding to a data input/output speed. Read data may be sequentially transmitted in synchronization with the data strobe signal DQS.

In addition, the controller 200 may include at least one processor 210 (central processing units (CPUs)), a buffer memory 220, and a security module 260.

The processor 210 may be implemented to control an overall operation of the storage device 20. The processor 210 may perform various management operations such as cache/buffer management, firmware management, garbage collection management, wear leveling management, data deduplication management, read refresh/reclaim management, bad block management, multi-stream management, mapping of host data and nonvolatile memory, quality of service (QOS) management, system resource allocation management, nonvolatile memory queue management, read level management, erase/program management, hot/cold data management, power loss protection management, dynamic thermal management, initialization management, redundant array of inexpensive disk (RAID) management, and the like.

The buffer memory 220 may be implemented as a volatile memory (for example, static random access memory (SRAM), dynamic RAM (DRAM), synchronous RAM (SDRAM), or the like, or a nonvolatile memory (flash memory, phase-change RAM (PRAM), magneto-resistive RAM (MRAM), resistive RAM (ReRAM), ferroelectric RAM (FRAM), or the like).

The security module 260 may be implemented to perform a security function of the storage device 20. For example, the security module 260 may perform a self-encryption disk (SED) function or a trusted computing group (TCG) security function. The SED function may store encrypted data in the nonvolatile memory device 100 using an encryption algorithm or may decrypt data encrypted from the nonvolatile memory device 100. The encryption/decryption operation may be performed using an internally generated encryption key. In some example embodiments, the encryption algorithm may be an advanced encryption standard (AES) encryption algorithm. However, the encryption algorithm is not limited thereto. The TCG security function may provide a mechanism enabling access control to user data on the storage device 20. For example, the TCG security function may perform an authentication procedure between an external device and the storage device 20. In some example embodiments, the SED function or the TCG security function may be optionally selected.

In addition, the security module 260 may generate ciphertext (EDATA) based on a leveled homomorphic encryption algorithm. The security module 260 may receive an operation result received from a host device and may decrypt the result based on the leveled homomorphic encryption algorithm.

The example embodiment may be applicable to an electronic device having a storage device.

Figure 12:
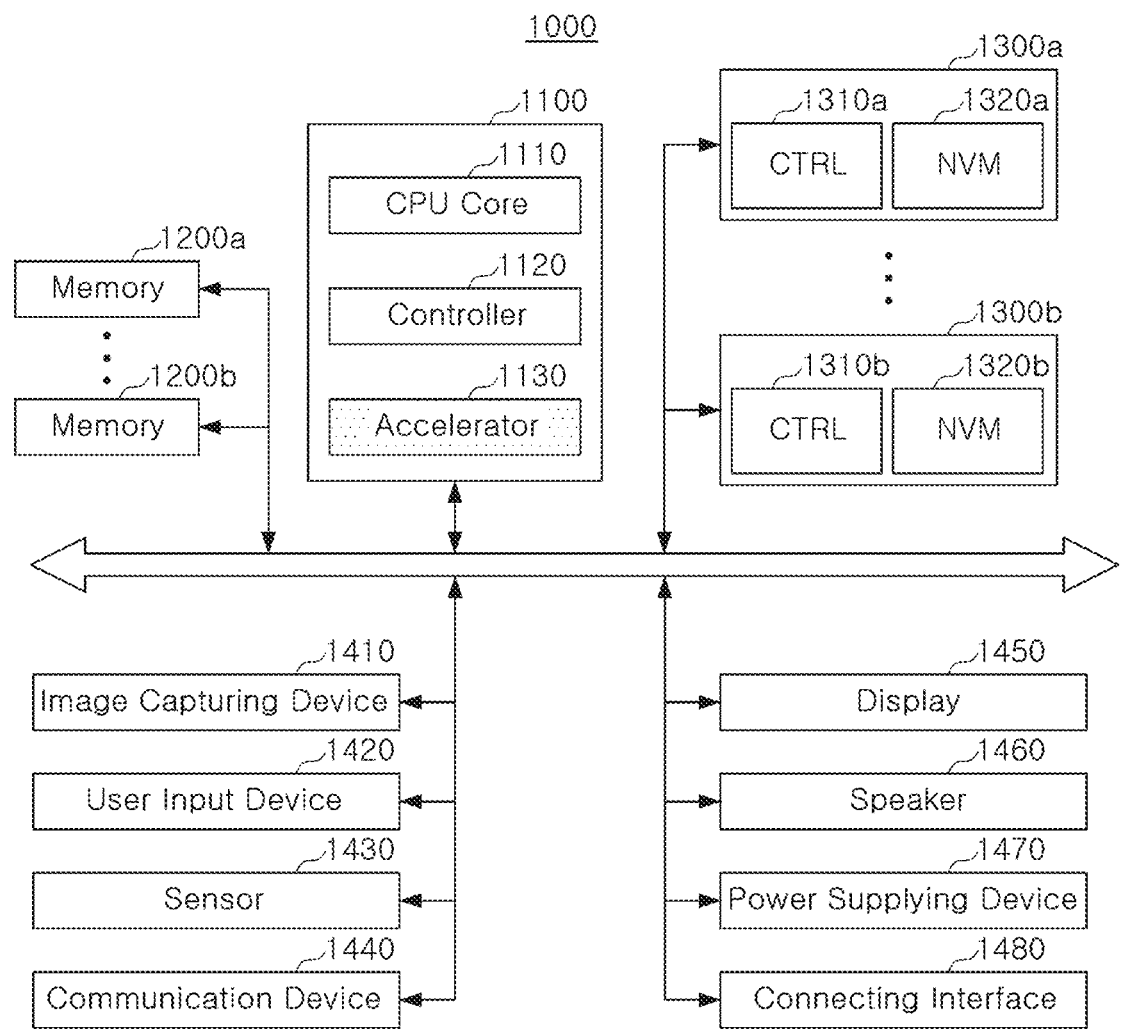
FIG. 12 is a diagram illustrating an electronic device to which a storage device is applied according to some example embodiments.

FIG. 12 is a diagram illustrating an electronic device 1000 to which a storage device is applied according to some example embodiments. The electronic device 1000 illustrated in FIG. 11 may be implemented as a mobile system such as a mobile phone, a smart phone, a tablet personal computer (PC), a wearable device, a health care device, or an IoT device. However, the electronic device 1000 in FIG. 1 is not necessarily limited to the mobile system, and may be implemented as a personal computer, a laptop computer, a server, a media player, or an automotive device such as a navigation device.

Referring to FIG. 12, the electronic device 1000 may include a main processor 1100, memories 1200a and 1200b, and storage devices 1300a and 1300b. In addition, the electronic device 1000 may further include one or more of an image capturing device 1410, a user input device 1420, a sensor 1430, a communication device 1440, a display 1450, a speaker. 1460, a power supplying device 1470, and a connecting interface 1480.

The main processor 1100 may control an overall operation of the electronic device 1000, more specifically, operations of other components included in the electronic device 1000. The main processor 1100 may be implemented as a general processor, a dedicated processor, or an application processor.

The main processor 1100 may include one or more CPU cores 1110. In addition, the main processor 1100 may further include a controller 1120 for controlling the memories 1200a and 1200b or the storage devices 1300a and 1300b. In some example embodiments, the main processor 1100 may further include an accelerator 1130, a dedicated circuit for high-speed data operation such as artificial intelligence (AI) data operation or the like. The accelerator 1130 may include a graphics processing unit (GPU), a neural processing unit (NPU), or a data processing unit (DPU). The accelerator 1130 may be implemented as the homomorphic encryption operation accelerator described with reference to FIGS. 1 to 11. The accelerator 1130 may be implemented as a chip physically independent from the other components of the main processor 1100.

The memories 1200a and 1200b may be used as main memory devices of the electronic device 1000. The memories 1200a and 1200b may include a volatile memory such as SRAM or DRAM or may include a nonvolatile memory such as a flash memory, PRAM or RRAM. The memories 1200a and 1200b may be implemented in the same package as that of the main processor 1100.

The storage devices 1300a and 1300b may be implemented as nonvolatile storage devices storing data regardless of whether power is supplied or not. The storage devices 1300a and 1300b may have a relatively large storage capacity compared to those of the memories 1200a and 1200b. The storage devices 1300a and 1300b may include memory controllers 1310a and 1310b and nonvolatile memory (NVM) 1320a and 1320b for storing data under control of the memory controllers 1310a and 1310b. The nonvolatile memories 1320a and 1320b may include a flash memory having a two-dimensional (2D) structure or a three-dimensional (3D) vertical NAND (V-NAND) structure or may include other types of nonvolatile memory such as PRAM or RRAM.

The storage devices 1300a and 1300b may be included in the electronic device 1000 in a state of being physically separated from the main processor 1100. In addition, the storage devices 1300a and 1300b may be implemented in the same package as that of the main processor 1100. In addition, the storage devices 1300a and 1300b may have the same form as that of a solid state device (SSD) or a memory card, so that the storage devices may be detachably connected to the other components of the electronic device 1000 through an interface such as the connecting interface 1480. The storage devices 1300a and 1300b may be applied with standard protocols such as universal flash storage (UFS), embedded multi-media card (eMMC), or nonvolatile memory express (NVMe), but example embodiments thereof are not limited thereto.

The image capturing device 1410 may obtain a still image or a video. The image capturing device 1410 may be implemented as a camera, a camcorder, or a webcam.

The user input device 1420 may receive various types of data input from a user of the electronic device 1000, and may be implemented as a touch pad, a keypad, a keyboard, a mouse or a microphone.

The sensor 1430 may detect various types of physical quantities which may be obtained from an external entity of the electronic device 1000 and may convert the sensed physical quantities into electrical signals. The sensor 1430 may be implemented as a temperature sensor, a pressure sensor, an illuminance sensor, a position sensor, an acceleration sensor, a biosensor, or a gyroscope sensor. The communication device 1440 may transmit and receive wired/wireless signals to and from external devices of the electronic device 1000 according to various communication protocols. The communication device 1440 may include an antenna, a transceiver, or a modem (MODEM). The display 1450 and the speaker 1460 may function as (or be configured as) output devices respectively outputting visual information and auditory information to a user of the electronic device 1000. The power supply device 1470 may appropriately convert power supplied from a battery embedded in the electronic device 1000 or an external power source and may supply power to each of components of the electronic device 1000.

The connecting interface 1480 may provide connection between the electronic device 1000 and an external device connected to the electronic device 1000 to exchange data with the system 1000. The connecting interface 1480 may be implemented in various interface manners such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), secure digital (SD) card, multimedia card (MMC), eMMC, UFS, embedded universal flash storage (eUFS), and compact flash (CF) card interface.

Figure 13:
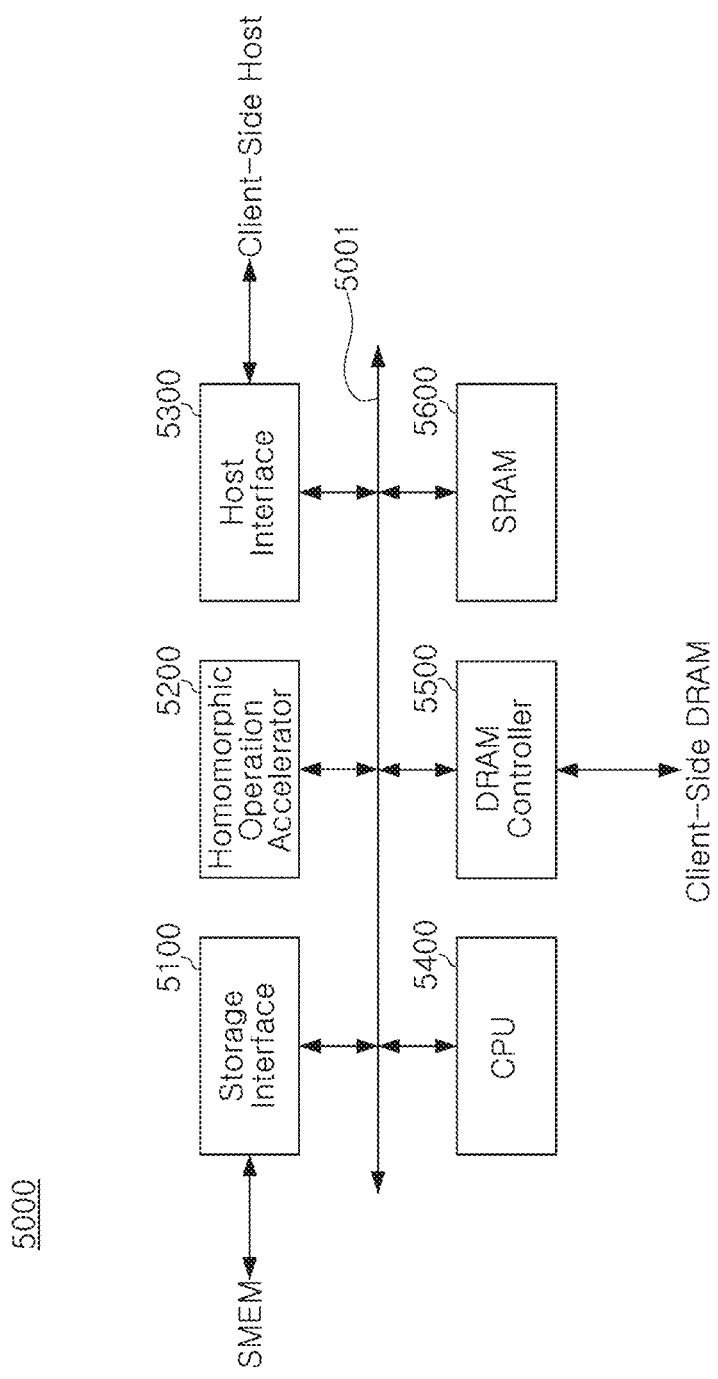
FIG. 13 is a diagram illustrating a storage controller according to some example embodiments.

FIG. 13 is a diagram illustrating a storage controller according to some example embodiments. Referring to FIG. 13, the storage controller 5000 may include a main bus 5001, a storage interface 5100, a homomorphic encryption operation accelerator 5200, a host interface 5300, a processor 5400, a DRAM controller 5500, and SRAM 5600. The storage interface 5100 may perform communication between the storage controller 5000 and a storage memory SM. The host interface 5300 may perform communication between the storage controller 5000 and a server-side host. The main bus 5001 may perform communication between the respective components 5100, 5200, 5300, 5400, 5500 and 5600 included in the storage controller 5000.

A homomorphic encryption operation accelerator 5200 may be implemented to receive homomorphic ciphertexts, perform a homomorphic operation between the received homomorphic ciphertexts, and generate the computed homomorphic ciphertext as a result of performing the operation. In some example embodiments, the homomorphic encryption operation accelerator 5200 may further receive a ciphertext operation level. Here, the ciphertext operation level may refer to the maximum number of times a multiplication operation may be performed between pieces of homomorphic ciphertext data without a bootstrapping process.

The homomorphic encryption operation accelerator 5200 may be implemented as the homomorphic encryption operation accelerator described with reference to FIGS. 1 to 11.

The processor 5400 may control a read operation and a write operation on the storage memory SM. The processor 5400 may perform the above-described NTT, iNTT, matrix vector multiplication, modular polynomial multiplication, and modular polynomial addition operations. However, example embodiments are not limited thereto. Although not illustrated in FIG. 13, the NTT, iTTT, matrix vector multiplication, modular polynomial multiplication, and modular polynomial addition operations may be implemented and performed as a module distinguished from the processor 5400.

Figure 14:
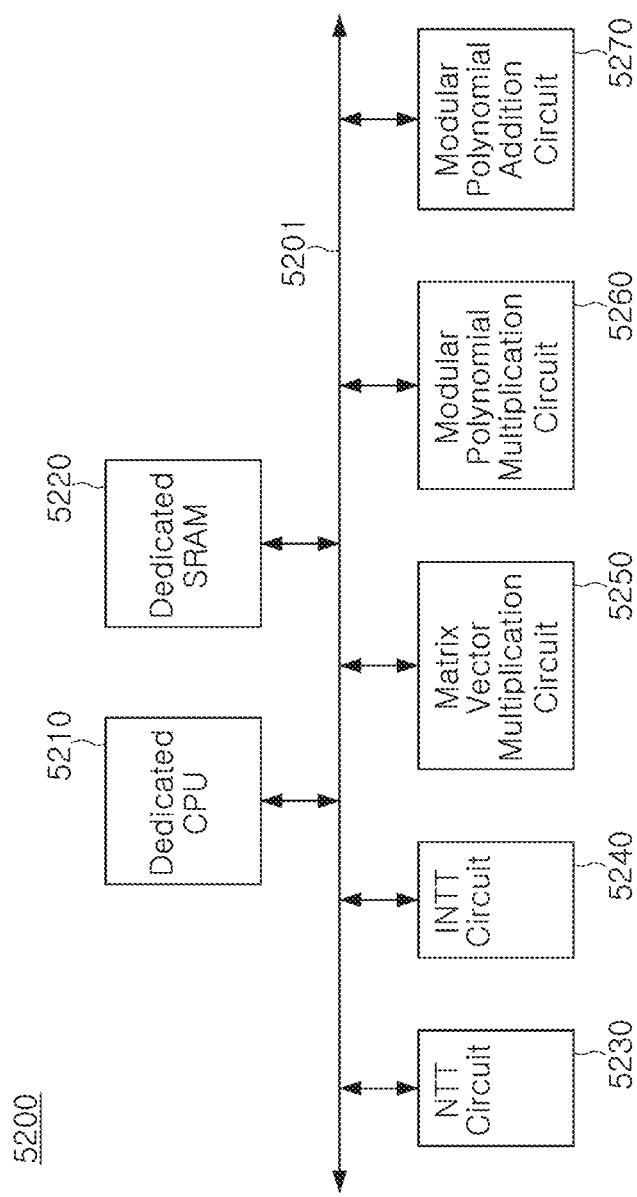
FIG. 14 is a diagram illustrating a homomorphic encryption operation accelerator according to some example embodiments.

FIG. 14 is a diagram illustrating the homomorphic encryption operation accelerator 5200 illustrated in FIG. 13. Referring to FIG. 14, the homomorphic encryption operation accelerator 5200 may include a dedicated processor 5210 connected to a bus 5201, a dedicated memory 5220, an NTT circuit 5230, an INTT circuit 5240, a matrix vector multiplication circuit 5250, a modular multiplication circuit 5260, and a modular addition circuit 5270.

The dedicated processor 5210 may generally control the components 5210, 5220, 5230, 5240, 5250, 5260 and 5270 of the homomorphic encryption operation accelerator 5200. The dedicated processor 5210 may be provided in the homomorphic encryption operation accelerator 5200 separately from the processor 5400 included in the storage controller 5000. In some example embodiments, the dedicated processor 5210 may be a digital signal processor (DSP). The dedicated processor 5210 may perform a high level of parallel processing of a floating-point operation. However, example embodiments are not limited thereto. The dedicated processor 5210 may be one of a microprocessor, an application processor, or an ARM processor.

The dedicated memory 5220 may temporarily store pieces of result data according to operations of the NTT circuit 5230, the INTT circuit 5240, the matrix vector multiplication circuit 5250, the modular polynomial multiplication circuit 5260, and the modular polynomial addition circuit 5270. The NTT circuit 5230 may be implemented to transform data to simplify computational complexity of polynomial multiplication. The INTT circuit 5240 may be implemented to inversely transform a computed value of an output value of the NTT circuit 5230. The matrix vector multiplication circuit 5250 may be implemented to perform a matrix vector multiplication operation. The modular polynomial multiplication circuit 5260 may be implemented to perform a multiplication operation between R-LWE-based homomorphic ciphertexts. The modular polynomial addition circuit 5270 may be implemented to perform an addition operation between RLWE-based homomorphic ciphertexts.

According to some example embodiments, overall operation execution time may be reduced by allowing a number theoretic transform (NTT) operation and a fast-base conversion (BaseConv) operation corresponding to main operations required for an operation accelerator that performs a homomorphic encryption operation, one of post-quantum encryption schemes, to be performed in parallel. In addition, energy efficiency may be improved by configuring a memory system in consideration of data access patterns of the two operations performed in parallel. Homomorphic encryption may be divided into several homomorphic encryption systems according to an encryption method. There may be an operation method for each homomorphic encryption system. However, the technology according to some example embodiments may be applicable to accelerate NTT and BaseConv, which are commonly used in several homomorphic encryption systems, and thus may be widely applicable. Homomorphic encryption has been in the spotlight in that it is a post-quantum encryption scheme and it is possible to perform an operation in an encrypted state, and thus research for commercialization of homomorphic encryption has been actively conducted. An issue in the process of commercialization of homomorphic encryption may be an increase in operation time due to high computational complexity of homomorphic encryption (computational complexity increases by 10 to 10,000 times compared to that of an operation on unencrypted data). Operation time may be reduced using an operation accelerator specialized for a corresponding operation. According to some example embodiments, main operations commonly used in several homomorphic encryption systems may be performed in parallel, thereby being used for accelerators targeting various homogeneous encryption systems.

Any of the elements and/or functional blocks disclosed above may include or be implemented in processing circuitry such as hardware including logic circuits; a hardware/software combination such as a processor executing software; or a combination thereof. For example, the controller 1120, accelerator 1130, CTRL 1310a, 1310b, control logic 150 DRAM controller 5500, and homomorphic operation accelerator 5200 may be implemented as the processing circuitry. The processing circuitry may more specifically include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While some example embodiments have been shown and described above, it will be apparent to those skilled in the art that modifications and variations could be made without departing from the scope of the example embodiments as defined by the appended claims.

What is claimed is:

1. An operating method of a homomorphic encryption operation accelerator located within a cloud server, the method comprising:
    receiving at the cloud server, a search request to perform a search for existence of an original data at the cloud server from a user device, the request comprising an encrypted original data;
    performing a number of theoretic transform (NTT) operations on a number of polynomials included in the encrypted original data received from the user device and encrypted data stored at the cloud server, in parallel with a base conversion operation to accelerate the search by,
        performing the NTT operations on each of first homomorphic ciphertext and second homomorphic ciphertext while deriving a partial sum for the base conversion operation on the number of polynomials, wherein the first homomorphic ciphertext and the second homomorphic ciphertext correspond to the encrypted original data received and the encrypted data stored at the cloud server, respectively;
        performing the base conversion operation by adding the partial sum to a first value of each of the NTT operations to generate a rescaled ciphertext for each the first homomorphic ciphertext and the second homomorphic ciphertext, wherein the base conversion operation is a conversion of a base set on an NTT domain into a base set of a residue number system (RNS);
    transmitting, by the cloud server over a communication channel, a search result including the rescaled ciphertext for the second homomorphic ciphertext to the user device to decrypt the rescaled ciphertext for the second homomorphic ciphertext to generate a decrypted result; and
    enabling, by the homomorphic encryption operation accelerator, the user device to determine of the existence of the original data at the cloud server based on the decrypted result without the homomorphic encryption operation accelerator accessing the decrypted result.

2. The method of claim 1, wherein the performing the NTT operation includes performing a first NTT operation on a first polynomial corresponding to the first homomorphic ciphertext; and performing a second NTT operation on a second polynomial corresponding to the second homomorphic ciphertext, and the method further comprises:
    performing an element-wise multiplication operation on a first result of the performing the first NTT operation and a second result of the performing the second NTT operation to generate a product in an NTT domain; and
    performing an inverse NTT (INTT) operation on the product in the NTT domain after performing the element-wise multiplication operation.

3. The method of claim 1, wherein the NTT operations and the base conversion operation are performed through parallelization in a single instruction multiple data (SIMD) manner.

4. The method of claim 1, wherein
    the base conversion operation is performed in a plurality of lanes in which x multiplication operations are performed, wherein x is an integer greater than or equal to 2, and a corresponding register file is arranged in each of the plurality of lanes.

5. The method of claim 4, wherein a number of remainder polynomials are evenly arranged in an entire register file.

6. The method of claim 4, wherein the performing the base conversion operation includes sequentially moving data of a first level register file to a second level register file through a transposing unit.

7. The method of claim 6, wherein the performing the base conversion operation further includes:
    completing a partial sum operation on data of the second level register file; and
    performing a modular multiplication and accumulation operation using the data of the second level register file.

8. The method of claim 7, wherein the performing the modular multiplication and accumulation operation on the data of the second level register file is repeated until the data of the first level register file is exhausted.

9. An operating method of a homomorphic encryption operation accelerator located within a cloud server, the method comprising:
    receiving at the cloud server, a search request to perform a search for existence of an original data at the cloud server from a user device, the request comprising an encrypted original data;
    in response to receiving the search request and the encrypted original data, performing, by the homomorphic encryption operation accelerator, a number of theoretic transform (NTT) operations on a number of polynomials included in the encrypted original data received from the user device and encrypted data stored at the cloud server, in parallel with a base conversion operation, wherein the base conversion operation is a conversion of a base set on an NTT domain into a base set of a residue number system (RNS) to accelerate the search by,
        storing, in a first level register file, first data to be used for a base conversion operation, wherein the first data is a first polynomial corresponding to the encrypted original data;
        moving second data of the first level register file to a transposing unit, the second data is a second polynomial corresponding to the encrypted data stored, the second data being included in the first data;
        moving the second data from the transposing unit to a second level register file;
        performing an NTT operation on the first and second polynomials in parallel with a modular multiplication and accumulation operation using the second data stored in the second level register file;
        determining whether the second data stored in the second level register file is exhausted;

determining whether the first data stored in the first level register file is exhausted in response to the second data stored in the second level register file being exhausted;

determining whether the base conversion operation is completed and has generated a rescaled ciphertext, in response to the first data stored in the first level register file being exhausted;

transmitting, over a communication channel, an instruction to the user device to decrypt the rescaled ciphertext to generate a decrypted result; and enabling, by the homomorphic encryption operation accelerator, the user device to determine of the existence of the original data at the cloud server based on the decrypted result without the homomorphic encryption operation accelerator accessing the decrypted result.

10. The method of claim 9, wherein the performing the modular multiplication and accumulation operation is repeated until the second data stored in the second level register file is exhausted, in response to the second data stored in the second level register file not being exhausted.

11. The method of claim 9, wherein the moving the second data to the transposing unit is re-entered, in response to the first data stored in the first level register file not being exhausted.

12. The method of claim 9, the determining whether the first data stored in the first level register file is exhausted is re-entered, in response to the base conversion operation not being completed.

13. A homomorphic encryption operation accelerator located within a cloud server comprising:
processing circuitry configured to
perform a number theoretic transform (NTT) operations on a number of polynomials included in an encrypted original data received from a user device and encrypted data stored at the cloud server, in response to receiving a search request to perform a search for existence of an original data at the cloud server from the user device, the request comprising the encrypted original data, wherein the NTT operation is performed in parallel with a base conversion operation to accelerate the search by,
performing the NTT operations on each of first homomorphic ciphertext and second homomorphic ciphertext while deriving a partial sum for the base conversion operation on the number of polynomials, wherein the first homomorphic ciphertext and the second homomorphic ciphertext correspond to the encrypted original data received and the encrypted data stored at the cloud server, respectively,
performing the base conversion operation by adding the partial sum to a first value of each of the NTT operations to generate a rescaled ciphertext for each the first homomorphic ciphertext and the second homomorphic ciphertext, wherein the base conversion operation is a conversion of a base set on an NTT domain into a base set of a residue number system (RNS); and
transmitting, by the cloud server over a communication channel, a search result including the rescaled ciphertext for the second homomorphic ciphertext to the user device to decrypt the rescaled ciphertext for the second homomorphic ciphertext to generate a decrypted result; and
enabling, by the homomorphic encryption operation accelerator, the user device to determine of the existence of the original data at the cloud server based on the decrypted result without the homomorphic encryption operation accelerator accessing the decrypted result.

14. The homomorphic encryption operation accelerator of claim 13, wherein
the processing circuitry is further configured to move second data from a first level register file to a second level register file, the first level register file corresponding to each of a plurality of lanes, and the second level register file storing first data of the first level register file.

15. The homomorphic encryption operation accelerator of claim 14, wherein the processing circuitry is configured to perform modular multiplication and modular accumulation corresponding to the partial sum until the second data of the second level register file is exhausted.

16. The homomorphic encryption operation accelerator of claim 14, wherein the processing circuitry is further configured to move the second data from the first level register file to the second level register file using shift registers arranged in a lattice form in which a number of lanes is multiplied by the number of lanes.

17. The homomorphic encryption operation accelerator of claim 16, wherein
the processing circuitry is configured to receive the first data of the first level register file in a traverse direction, transmit second data among the received first data to the second level register file in a longitudinal direction, and accumulate the first data of the first level register file, third data of a register file storing a product of bases, and element-wise multiplication and addition.

* * * * *